US010451728B2

(12) United States Patent
Farmer et al.

(10) Patent No.: US 10,451,728 B2
(45) Date of Patent: Oct. 22, 2019

(54) APPARATUS AND METHOD FOR ATTENUATING CLOSE-RANGE RADAR SIGNALS WITH BALANCING FOR DUAL-FREQUENCY DIFFERENCE IN RADAR SIGNALS IN AN AUTOMOTIVE RADAR SENSOR

(71) Applicant: Veoneer US, Inc., Southfield, MI (US)

(72) Inventors: William Farmer, Boxborough, MA (US); Michael Paradie, Hollis, NH (US)

(73) Assignee: Veoneer US, Inc., Southfield, MI (US)

( * ) Notice: Subject to any disclaimer, the term of this patent is extended or adjusted under 35 U.S.C. 154(b) by 267 days.

(21) Appl. No.: 15/492,335

(22) Filed: Apr. 20, 2017

(65) Prior Publication Data

US 2017/0219691 A1 Aug. 3, 2017

Related U.S. Application Data

(63) Continuation-in-part of application No. 14/870,226, filed on Sep. 30, 2015.

(51) Int. Cl.
*G01S 13/93* (2006.01)
*G01S 7/288* (2006.01)
(Continued)

(52) U.S. Cl.
CPC .......... *G01S 13/931* (2013.01); *G01S 7/038* (2013.01); *G01S 7/2921* (2013.01);
(Continued)

(58) Field of Classification Search
CPC ...... G01S 7/2921; G01S 13/18; G01S 13/931; G01S 13/38; G01S 13/30; G01S 13/26;
(Continued)

(56) References Cited

U.S. PATENT DOCUMENTS 3,697,985 A   10/1972 Faris
3,766,554 A   10/1973 Tresselt
(Continued)

FOREIGN PATENT DOCUMENTS

EP    0974851    1/2000
FR    2941304    7/2010
(Continued)

*Primary Examiner* — Matthew M Barker
(74) *Attorney, Agent, or Firm* — Burns & Levinson, LLP; Steven M. Mills

(57) ABSTRACT

A radar signal transmitter transmits first and second radar signals at different first and second frequencies. A radar receiver receives reflected radar signals and generates receive signals indicative of the reflected radar signals. A first receive signal is indicative of a first reflected radar signal generated by reflection of the first transmitted radar signal, and a second receive signal is indicative of a second reflected radar signal generated by reflection of the second transmitted radar signal. A processor receives the first and second receive signals and computes a difference between the first and second receive signals to generate a difference signal. The processor processes the difference signal to provide radar information for the region, the processor adjusting at least one of amplitude and phase of at least one of the first and second receive signals such that the difference is optimized at a preselected range from the receiver.

32 Claims, 12 Drawing Sheets

(51) Int. Cl.
*G01S 7/03* (2006.01)
*G01S 7/292* (2006.01)
*G01S 13/18* (2006.01)
*G01S 13/26* (2006.01)
*G01S 13/30* (2006.01)
*G01S 13/38* (2006.01)

(52) U.S. Cl.
CPC ............ *G01S 7/2926* (2013.01); *G01S 13/18* (2013.01); *G01S 13/26* (2013.01); *G01S 13/30* (2013.01); *G01S 13/38* (2013.01); *G01S 2007/2886* (2013.01); *G01S 2013/9332* (2013.01); *G01S 2013/9378* (2013.01); *G01S 2013/9385* (2013.01); *G01S 2013/9389* (2013.01)

(58) Field of Classification Search
CPC .................. G01S 7/038; G01S 7/2926; G01S 2007/2886; G01S 2013/9314–9396
See application file for complete search history.

(56) References Cited

U.S. PATENT DOCUMENTS

| | | |
|---|---|---|
| 4,697,184 A | 9/1987 | Cheal |
| 4,893,125 A | 1/1990 | May |
| 5,521,600 A | 5/1996 | McEwan |
| 5,831,570 A | 11/1998 | Ammar |
| 6,646,592 B2 | 11/2003 | Matsuoka |
| 6,842,113 B2 | 1/2005 | Tsuji |
| 7,477,182 B2 | 1/2009 | Ikeda |
| 9,604,572 B2 | 3/2017 | Kohler |
| 2008/0186224 A1 | 8/2008 | Ichiyanagi |
| 2009/0102698 A1 | 4/2009 | Ichiyanagi |
| 2014/0052341 A1 | 2/2014 | Leach et al. |

FOREIGN PATENT DOCUMENTS

| | | |
|---|---|---|
| JP | 2006017622 | 1/2006 |
| JP | 4353008 | 10/2009 |
| WO | 9607931 | 3/1996 |

APPARATUS AND METHOD FOR ATTENUATING CLOSE-RANGE RADAR SIGNALS WITH BALANCING FOR DUAL-FREQUENCY DIFFERENCE IN RADAR SIGNALS IN AN AUTOMOTIVE RADAR SENSOR

RELATED APPLICATION

This application is a continuation-in-part (CIP) of copending U.S. patent application Ser. No. 14/870,226, filed in the U.S. Patent and Trademark Office on Sep. 30, 2015, the entire contents of which are incorporated herein by reference.

BACKGROUND

1. Technical Field

The present disclosure is related to automotive radar systems and, in particular, to an apparatus and method for attenuating close-range radar signals in an automotive radar sensor.

2. Discussion of Related Art

In automotive radar systems, the radar sensor can be mounted, i.e., physically attached, to the vehicle body or frame. Alternatively, the sensor can be mounted to the bumper fascia. Radar system performance is typically characterized based on the ability of the automotive radar system to detect objects and correctly determine their range, bearing and Doppler velocity. For radar processing purposes, it is often preferred that the sensor be mounted to the bumper fascia instead of the vehicle frame or body. This is because, when the sensor is mounted to the fascia, radar system performance is typically better because the radar sensor and fascia vibrate together, i.e., they are synchronized and in phase. As a result, the radar sensor sees the fascia as being stationary, i.e., at a constant distance, with respect to the radar sensor. The fascia is processed by the radar as a constant signal. As such, the signal due to the return from the fascia can be easily removed from the radar signal before further processing.

Some automobile manufacturers, however, prefer that the radar sensor be mounted on the body to enhance ease of assembly, or for other reasons. In that configuration, i.e., with the radar sensor mounted on the body or frame, radar system performance can be degraded by vibration, since movement of the fascia is not synchronized to movement of the sensor. Instead of the constant fascia signal, movement of the fascia relative to the sensor due to vibration appears as a time-varying signal, which can be difficult to remove from the radar signal. Incomplete removal of the fascia signal degrades the ability of the radar to detect objects and/or correctly estimate object parameters.

SUMMARY

According to one aspect, a radar system is provided. The radar system includes a radar signal transmitter for transmitting transmitted radar signals into a region, a first transmitted radar signal having a first frequency and a second transmitted radar signal having a second frequency different from the first frequency. A receiver receives reflected radar signals generated by reflection of the transmitted radar signals and generates receive signals indicative of the reflected radar signals, a first receive signal being indicative of a first reflected radar signal generated by reflection of the first transmitted radar signal, and a second receive signal being indicative of a second reflected radar signal generated by reflection of the second transmitted radar signal. A processor receives the first and second receive signals and computes a difference between the first and second receive signals to generate a difference signal, the processor processing the difference signal to provide radar information for the region, the processor adjusting at least one of amplitude and phase of at least one of the first and second receive signals such that the difference is optimized at a preselected range from the receiver.

In some exemplary embodiments, the processor adjusts at least one of amplitude and phase of at least one of the first and second receive signals using a minimization process. The minimization process can comprise an iterative minimization process. The minimization process can comprise a functional fit approach. The minimization process can comprise a steepest descent approach. The minimization process can comprise a multiple-hypothesis approach.

In some exemplary embodiments, a difference between the first frequency and the second frequency is selected such that the information related to objects in the region near the radar system is attenuated in the difference signal.

In some exemplary embodiments, a difference between the first frequency and the second frequency is selected such that a phase difference between the first and second reflected radar signals is such that information related to objects in the region near the radar system is attenuated in the difference signal.

In some exemplary embodiments, the first frequency is approximately 24.2 GHz.

In some exemplary embodiments, a difference between the first frequency and the second frequency is approximately 11 MHz.

In some exemplary embodiments, the transmitted radar signals are pulse radar signals. A pulse of the pulse radar signals can have a duration of approximately 120 nsec.

In some exemplary embodiments, the radar system is an automotive radar system. In the automotive radar system, a difference between the first frequency and the second frequency can be selected such that information related to objects in the region near the radar system is attenuated in the difference signal. The objects in the region near the radar system can include a bumper fascia of an automobile in which the radar system is disposed. The difference between the first frequency and the second frequency can be selected such that a phase difference between the first and second reflected radar signals is such that information related to objects in the region near the radar system is attenuated in the difference signal.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

According to the exemplary embodiments of the present disclosure, provided is an automotive radar system in which the undesirable effects of objects appearing at a particular predetermined range are removed from the radar signal. For example, the effects contributed to the radar signal by the bumper fascia of the host vehicle, which may generate a near-range time-varying signal due to vibrations and other movement relative to the radar sensor, can be eliminated. This results in substantially improved radar system performance characterized by substantial improvement in the ability of the automotive radar system to detect objects and correctly determine their range, bearing and Doppler velocity. According to the exemplary embodiments, the system of the disclosure eliminates or substantially reduces these undesirable effects by substantially or completely attenuating the signal at the range at which the object producing the signal, e.g., the bumper fascia, is located. The technique is also effective at removing any signal that is due to an object that is physically very close to the sensor, e.g., rain spray, reflection from rotating tire(s), etc. The technique of the current disclosure can also be used to attenuate signals at any predetermined range from the sensor.

Figure 1:
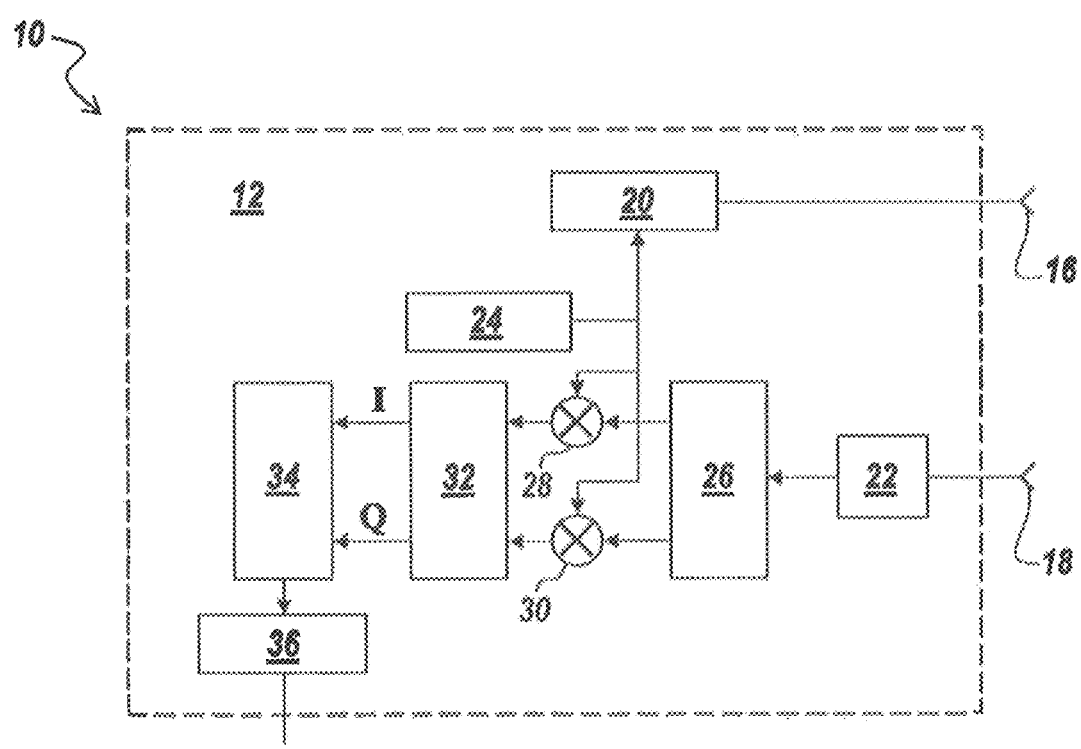
FIG. 1 includes a schematic block diagram of an automotive radar sensor module for processing automotive radar signals, in accordance with some exemplary embodiments.

FIG. 1 includes a schematic block diagram of an automotive radar system 10, including one or more radar sensor modules 12 for processing automotive radar signals, in accordance with some exemplary embodiments. Referring to FIG. 1, system 10 includes one or more radar modules 12, which process radar transmit and receive signals which are compatible with the radar detection and monitoring system 10 in the host automobile. Radar module 12 generates and transmits radar signals into the region adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping/timing circuitry, transmit trigger circuitry, RF switch circuitry, or any other appropriate transmit circuitry used by radar system 10.

Radar module 12 also receives returning radar signals at radar receive circuitry 22 via receive antenna 18. Radar receive circuitry 22 generally includes any circuitry required to process the signals received via receive antenna 18, such as pulse shaping/timing circuitry, receive trigger circuitry, RF switch circuitry, or any other appropriate receive circuitry used by the radar system. The received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34.

In automotive radar systems, these digitized I and Q baseband signals are processed by a processor, such as a digital signal processor (DSP) 36. In some exemplary embodiments, the DSP 36 can perform processing such as signal subtraction and/or Fast Fourier Transform (FFT) processing to generate a plurality of range bins processed according to the detailed description herein to attenuate close-range radar signals to improve performance of radar system 10. In one particular embodiment, radar system 10 is a blind spot radar system used to detect and/or identify objects in a blind spot of a host automobile.

Figure 2:
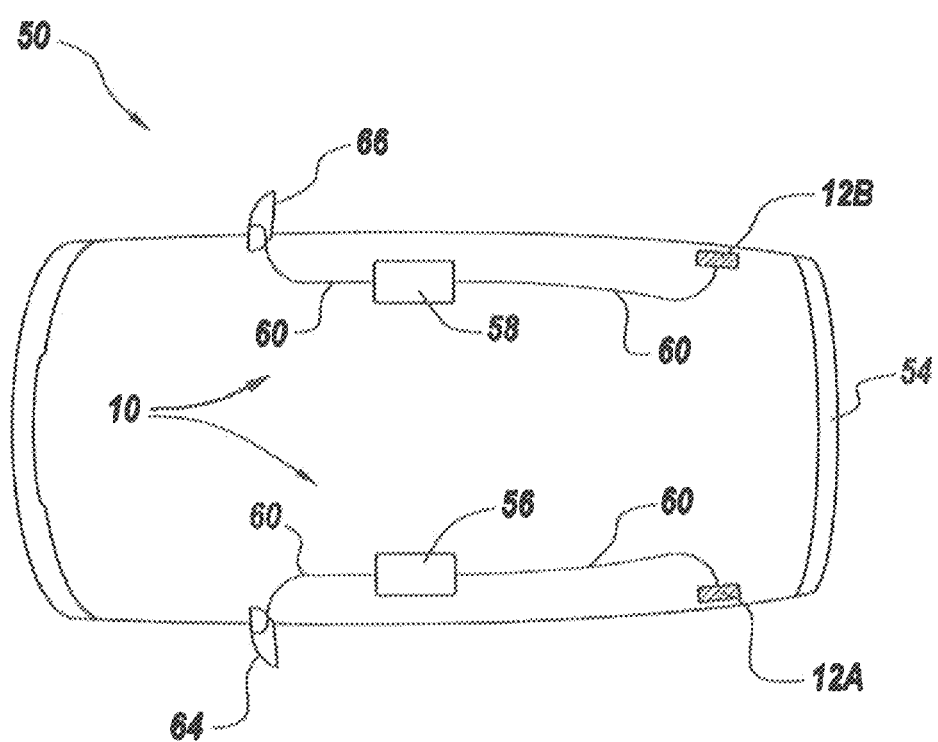
FIG. 2 includes a schematic top view of an automobile or vehicle equipped with a radar system, which includes one or more radar sensor modules, according to some exemplary embodiments.

FIG. 2 includes a schematic top view of an automobile or vehicle 50 equipped with radar system 10, which includes one or more radar sensor modules 12. In the particular embodiment illustrated in FIG. 2, radar system 10 is a blind spot system for reporting object detections in one or both blind spots of automobile 50. It will be understood that the present disclosure is applicable to other types of radar systems 10. A first radar sensor module 12A is connected via a bus 60, which in some exemplary embodiments is a standard automotive controller area network (CAN) bus, to a first CAN bus electronic control unit (ECU) 56. Object detections from radar sensor module 12A are reported to ECU 56, which processes the detections and provides detection alerts via CAN bus 60. In some exemplary embodiments, the alerts can be in the form of a visible indicator, such as a light-emitting diode (LED) in side mirror 64, which is visible to the driver. Similarly, in some exemplary embodiments, a second radar sensor module 12B is connected via CAN bus 60, to a second CAN bus electronic control unit (ECU) 58. Object detections from radar sensor module 12B are reported to ECU 58, which processes the detections and provides detection alerts via CAN bus 60 to a visible indicator, such as a light-emitting diode (LED) in side mirror 66.

According to the exemplary embodiments, during normal radar detection processing, radar sensor modules 12 operate by transmitting pulse radar signals in a sweep configuration into the region around vehicle 50. In some particular exemplary embodiments, given the application of system 10 to automotive radar, the range of system 10 can be, for example, approximately 13.0 meters. This total range is divided into a plurality of range increments, which are respectively associated with a plurality of range "bins." During radar detection processing, in some exemplary embodiments, at each increment, a plurality of transmit radar pulses is transmitted from sensor modules 12. The radar receiver "opens" to receive returning radar signals, as defined by the range particular range bin. The returning signals at each range are subject to an integration period during which the radar receive signals are sampled and held. At the end of the integration period for each range, the accumulated sampled and held receive signal is stored as the data in that range bin. The range for the next data collection period is then incremented, and the process repeats to generate data for the next range bin. This process continues until data is collected for all of the range increments in the total range of interest. In some particular exemplary embodiment, 256 range increments are used, having a range differential of approximately 0.05 meter, for a total maximum range of approximately 13.0 meters.

According to the present disclosure, to eliminate the undesirable effects of near-range objects, such as, for example, the bumper fascia 54 of vehicle 50, the receive signals for close ranges are substantially attenuated. According to the exemplary embodiments, this is accomplished by transmitting at least two sets of radar pulse signals at each range and generating the receive signal data for each range bin using a combination of the receive signals generated in response to the two sets of transmit signals for the range. Specifically, according to some exemplary embodiments, within each range increment, a first transmit pulse at a first frequency f1 is transmitted. Returns such as reflected signals are received and stored for this transmit pulse during a first receive period determined by the activation of a receive pulse or receive gate. Next, a second transmit pulse at a second frequency f2 is transmitted. Returns associated with this second transmit pulse are received and stored during a second receive period determined by the activation of a second receive pulse or receive gate. In some exemplary embodiments, at each range increment, this process of transmitting radar illumination pulses at frequencies alternating in frequency between f1 and f2, and receiving and storing return data for each transmit pulse can be repeated for the purpose of, for example, improving signal-to-noise ratio (SNR). In one particular exemplary embodiment, during each range increment 29 pairs of illumination pulses are transmitted, alternating in frequency between f1 and f2. Alternatively, in other particular exemplary embodiments, 29 pulses at a first frequency f1 are transmitted followed by 29 pulses at a second frequency f2. Then, according to exemplary embodiments, for each range increment, a complex subtraction is performed between the two generated receive signals to generate the actual receive signal data for the range increment. This difference signal is then processed instead of one of the actual receive signals to perform object detection.

According to the exemplary embodiments, the difference in transmit frequencies causes a phase difference between the associated receive signals. When the complex subtraction of the signals is performed, the signals with the smallest phase difference are effectively eliminated, since the direct subtraction of the similar signals results in a very small resulting signal. Understanding that the signals from the smallest, i.e., closest, ranges will have the smallest phase difference, because of the relatively small round-trip return time of the radar signals, the effect of the approach of the disclosure is to attenuate the near-range signals. Thus, in the case of, for example, the bumper fascia, or other near-range objects, the receive signals are so substantially attenuated as to be effectively eliminated from the object detection radar processing.

Figure 3:
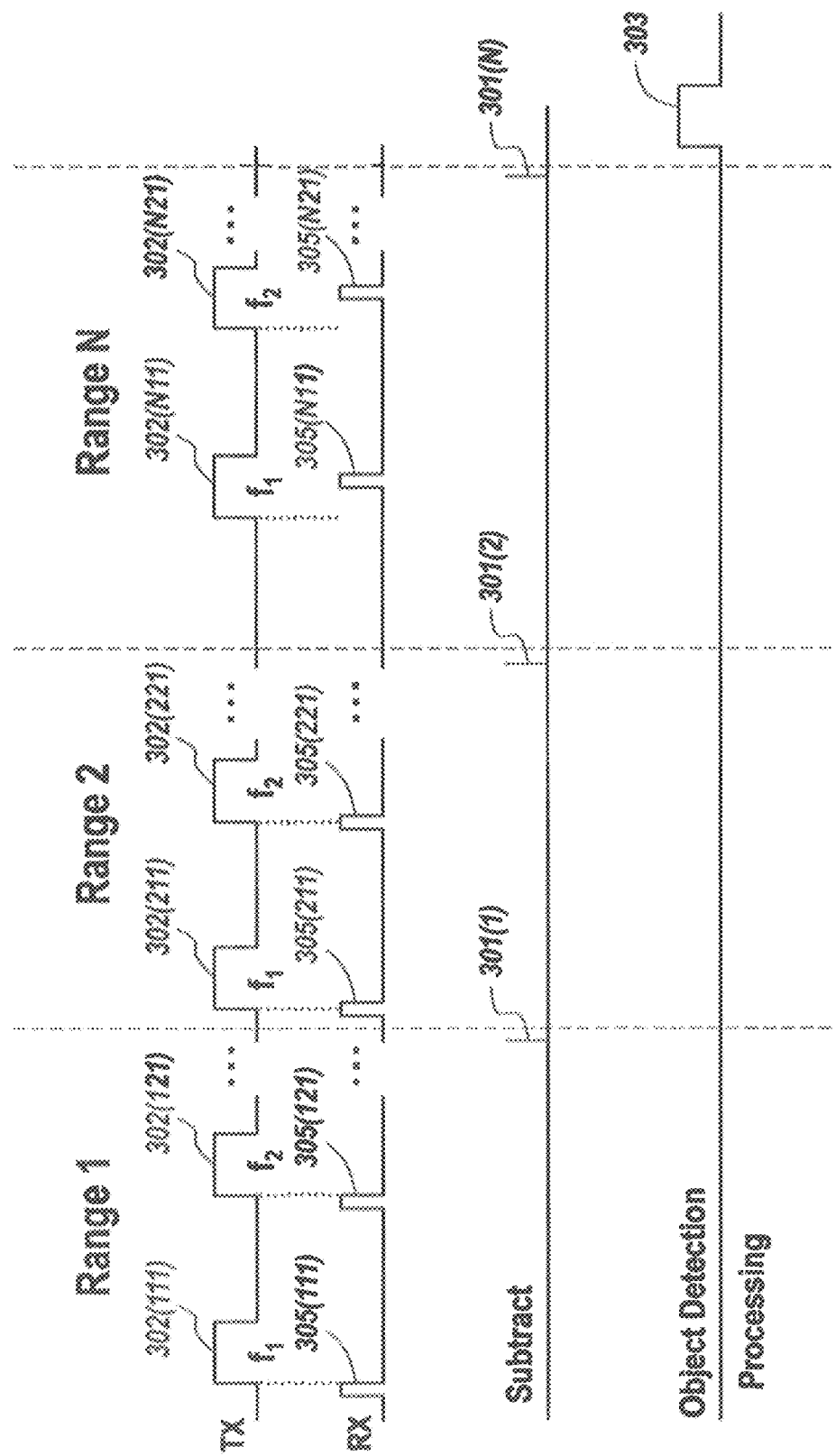
FIG. 3 includes a schematic timing diagram, which illustrates exemplary timing of the radar processing to attenuate near-range objects, according to some exemplary embodiments.
Figure 4:
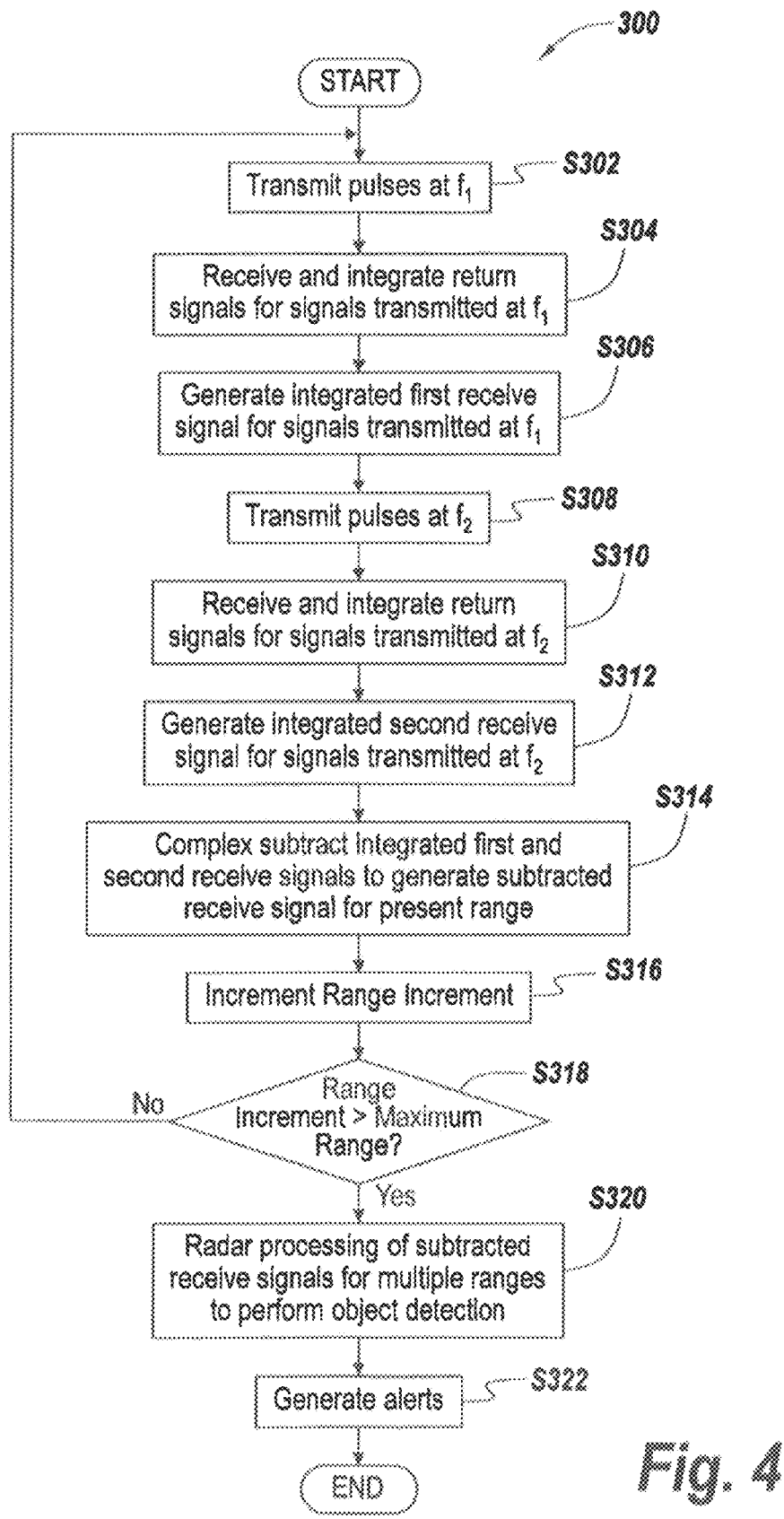
FIG. 4 includes a logical flow diagram illustrating the logical flow of the radar processing to attenuate near-range objects, according to some exemplary embodiments.

FIG. 3 includes a schematic timing diagram which illustrates exemplary timing of the radar processing to attenuate near-range objects, according to some exemplary embodiments. FIG. 4 includes a logical flow diagram illustrating the logical flow of the radar processing to attenuate near-range objects, according to some exemplary embodiments. In the timing diagram of FIG. 3, the first curve illustrates exemplary timing of exemplary illuminating transmit pulses, the second curve illustrates exemplary timing of exemplary receive and integration processing, the third curve indicates exemplary timing of complex subtraction of the integrated receive signals, and the fourth curve indicate exemplary object detection radar processing on the subtracted receive signals for multiple range increments.

Referring to FIGS. 3 and 4, in step S302, for the first range, i.e., Range 1, an illuminating radar pulse is transmitted at a first frequency f1, as indicated by 302(111), where, by convention used herein, the first number in parentheses indicates range increment 1, the second number in parentheses indicates frequency number 1, and the third number in parentheses indicates the number of the pair of transmit pulses. Although not illustrated in FIG. 3, this third number would run in a range from 1 to the number of repetitions of the f1/f2 transmit pairs, which, as noted above, in one particular exemplary embodiment, is 29. Returns are received and integrated in step S304 for the first transmit pulse in the first range, i.e., 302(111), as indicated by active receive signal or receive "gate" 305(111). As indicated in step S306, an integrated first receive signal for the signal transmitted at f1 is generated. Next, as indicated in step S308, for the first range increment, i.e., Range 1, radar pulse 302(121) is then transmitted at second frequency f2. Returns are received and integrated in step S310 for the second transmit pulse 302(121) in the first range increment as indicated by active receive signal or receive "gate" 305(121). As indicated in step S312, an integrated second receive signal for the signal transmitted at f2 is generated.

As described above, steps S302 through S312 can be repeated any number of times within the present range increment, e.g., Range 1. As described above, in some particular exemplary embodiments, these steps are repeated 29 times for each range increment to generate integrated first and second receive signals.

Next, as indicated in step S314 and by pulse 301(1) in FIG. 3, the integrated first and second receive signals are subtracted to generate a subtracted receive signal for the current range increment, i.e., Range 1. Generally, the subtraction is a complex subtraction of complex numbers. As indicated in step S316, the range increment number is incremented, e.g., to Range 2, and, in decision step S318, the range increment is checked to determine whether the maximum range of interest being processed has been reached. If not, then flow returns to step S302, and the process of steps S302 through S318 is repeated for the next range increment, i.e., Range 2. That is, two sets of transmit pulses are transmitted at frequencies f1 and f2 in Range 2, and return signals are received and integrated as illustrated by receive active signals or receive gates 305(211) and 305(221). Subtraction is performed at 301(2) for range increment Range 2.

The above process continues until the entire process is complete, i.e., a subtracted receive signal is generated for each range increment or bin in the total range of interest. That is, as illustrated in FIG. 3, the process continues until a subtracted receive signal for Range N is competed. This is referred to as a complete sweep of transmit pulses. After the complete sweep, in decision step S318, the present range will exceed the maximum range N, and flow continues to step S320. In step S320, radar processing of the subtracted receive signals for the multiple ranges is performed to provide object detection, as indicated by active object detection processing signal 303 in the timing diagram of FIG. 3. According to the exemplary embodiments, in contrast to prior systems, the radar object detection of step S320 is carried out with the effects of irrelevant near-range objects, such as, for example, the bumper fascia, removed and, therefore, not influencing radar object detection. In step S322, when relevant objects are detected, alerts are generated.

With reference to FIG. 3, it is noted that the different range increments are achieved by varying the time at which the receiver is opened up to receive and process returns, relative to the timing of the transmit pulses. That is, referring to FIG. 3, the timing of the active receiver periods or range "gates" 305 with respect to the transmit pulses is varied. By opening up the receiver period later, a longer range is being analyzed, due to the longer round-trip time of the signals being received and processed. However, because of the relatively long transmit pulses and the relatively short receive pulses, all returns will include information related to short-range targets, e.g., the bumper fascia. That is, all returns will be due to reflections from all objects between immediately adjacent to the radar unit out to the maximum range determined for the particular range increment, which is defined by the relative timing of the transmit and receive pulses. According to the disclosure, the complex subtraction of the returns due to the different transmit frequencies within a range increment attenuates the effects of these returns which are from close range objects.

According to the present disclosure, each transmit pulse is transmitted and possibly reflected off an object, and the reflected return is received before the next transmit pulse is transmitted. Hence, according to particular exemplary embodiments as illustrated in FIG. 3, the transmit pulses and receive pulses are interleaved, actually overlapping due to the length of the transmit pulses. According to the disclosure, the leading edge of each receive pulse is precisely timed with the leading edge of its respective associated transmit pulse in order to control the maximum range of object reflections what will be received in that range increment or bin. The transmit pulses are very long due to regulatory constraints. In some particular exemplary embodiments, the transmit pulses have a duration of approximately 120 ns. Also, the receive pulses are relatively very short and occurs during some portion of the time during which the associated transmit pulse is being transmitted. This configuration results in each range increment or bin having reflected energy from all objects at the maximum range of the bin in addition to all shorter ranges. That is, because of the relative time durations of the transmit pulses and their respective associated receive pulses, reflected energy from close-range objects such as the bumper fascia, appears in every range bin for the waveform being used. The present disclosure provides an approach to attenuating or eliminating the effects of this unwanted reflected energy from the radar object detection processing of the system.

In some particular exemplary embodiments, the total range of the system is approximately 13.0 meters, and each sweep includes 256 range increments or bins, i.e., N=256, resulting in approximately 0.05 meter/bin, and each receive active period or gate 305 opening at one of 256 unique delay times.

According to the disclosure, the radar sensor transmits the desired waveform twice. The first transmission uses the nominal radio frequency of the system, which in some particular exemplary embodiments, can be approximately 24.2 GHz. The second transmission is at a radio frequency offset up or down from the first frequency by some value, e.g., 11 MHz. According to the disclosure, the received signal from the first part can be subtracted from the received signal of the second part. Each signal is complex, so the resulting subtracted signal is also complex, having real and imaginary parts. The resulting complex subtracted signal is then processed with the same procedure of the original waveform of prior system, which would only be transmitted once, in order to perform object detection and parameter estimation.

Thus, the technique of the present disclosure creates attenuation of signals, where the attenuation depends on object range. In an ideal case, zero range has complete attenuation. Attenuation decreases as object range increases, up to a certain range which has no attenuation of signal energy. At the range where there is no attenuation of signal energy, the two signals actually add in phase, which can result in an improvement in signal-to-noise ratio (SNR), for example, a 3 dB improvement in SNR. In some exemplary embodiments, the range at which zero attenuation occurs depends on the frequency offset of the first and second waveform parts, i.e., sets of transmit pulses. This is because the slight difference in frequency causes a difference in phase of the returning signals. This phase difference is range-dependent. Close-range signals will have smaller path-length difference, and, therefore, less phase difference. As a result, when the subtraction is performed, the signal exhibits greater attenuation. For example, an offset of approximately 11 MHz can be used to achieve zero attenuation at approximately 6.8 meters.

Figure 5:
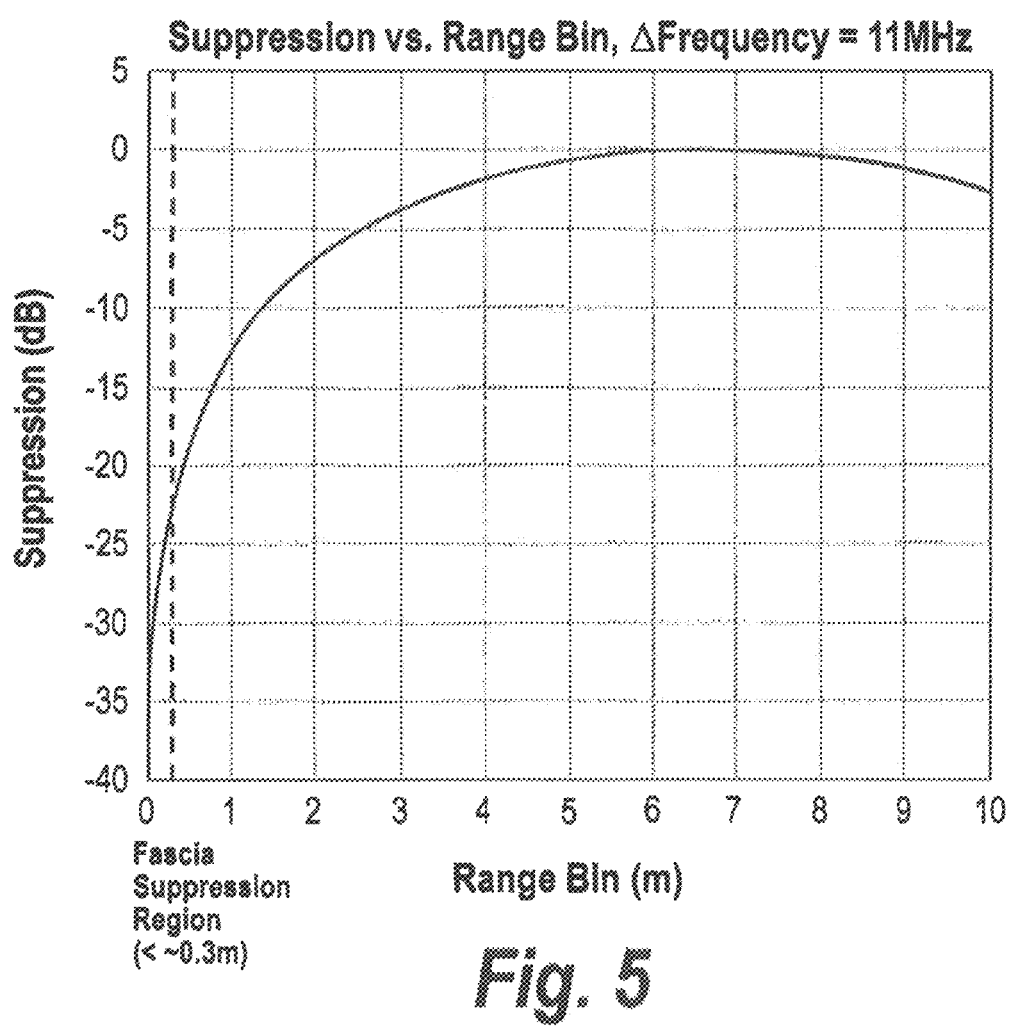
FIG. 5 is a graph of suppression (attenuation) versus range bin in the automotive radar system, according to some exemplary embodiments.

FIG. 5 is a graph of suppression (attenuation) versus range bin. As shown in FIG. 5, suppression at the range of the fascia, i.e., less than 0.3 meter in range, is substantial, whereas, at a range of approximately 6.8 meters, suppression is zero.

It should also be noted that the relative durations of the events depicted in the timing diagram of FIG. 3 are not to scale. For example, in some exemplary embodiments, the transmit pulse width is comparatively long, and the receive gate duration is comparatively short. In some particular exemplary embodiments, the transmit pulse width is approximately 120 ns, and the receive gate width is 8 ns.

In other exemplary embodiments, the attenuation behavior of the system can be tailored to particular performance requirements. As described in detail above, pulse radar systems such as the system described and claimed herein consider the presence of an object at a certain range or range bin, then at a slightly different range, typically either slightly nearer to or slight further from the radar. This is repeated bin-by-bin until the entire range of interest has been covered. According to the disclosure, a particular frequency offset can be chosen for each range bin in order to control attenuation of undesired versus desired objects in each range bin. The maximum attenuation is normally at zero range, while the fascia is usually present at a slightly different range. According to some exemplary embodiments, phase rotations of one of the received signal parts can be introduced to move the maximum attenuation to any desired range. Also, according to some exemplary embodiments, transmit pulses can be transmitted with more than one frequency offset, e.g., 10 MHz and 20 MHz. In this case, the complex subtraction can be performed on different pairs, depending on the range of the object to be detected. According to exemplary embodiments, by appropriate choice of the frequency offsets and chosen pairs, attenuation of selected object signals can be optimized, e.g., minimized, at particular ranges of interest.

Hence, according to the foregoing detailed description of exemplary embodiments, automotive radar sensors operating behind the bumper fascia typically detect a strong signal from nearby objects, most notably from the bumper fascia. Certain radars using a long transmit pulse collect this reflected signal into many or all of the measurements for larger ranges, where it becomes a source of unwanted noise. In particular, rapid changes in the area around the bumper which may arise, for example, from vibration or precipitation effects, can produce an unwanted Doppler signal that masks the desired Doppler detection targets at a greater range. This signal is normally unwanted, since it degrades the ability of the radar to detect objects and correctly estimate object parameters. Phenomena which can cause these changes include mechanical vibration of the fascia and rain moving on or near the fascia.

The technique described herein in detail to reduce these unwanted signals uses the difference of two transmitted frequencies, producing a beat pattern, to attenuate close-range, i.e., bumper fascia, signals while amplifying signals from greater ranges. The technique is referred to herein as "FSK subtraction," or simply "FSK," which should not be confused with the well-known acronym for frequency-shift keying, although, in exemplary embodiments, the technique does utilize continuous-wave radar signals of at least two different frequencies. The beat pattern from the two frequencies substantially cancels the signal from the fascia and nearby objects, while producing constructive adding for targets at longer ranges. In some particular embodiments, the technique described herein is used in a continuous-wave automotive radar system for blind spot detection.

FSK subtraction can leave an unwanted residual from the fascia and nearby objects when characteristics of the two received and differenced signals do not exactly match. According to the exemplary embodiments, it is determined that both amplitude differences and phase differences are present between the two signals at relatively close range, e.g., at fascia range. Also, characteristics of the received signals may change in response to environmental changes. Examples of such changes include movement or deformation of the fascia, movement of rain drops across the fascia, a splash of water on the fascia, or other such changes.

Figure 6:
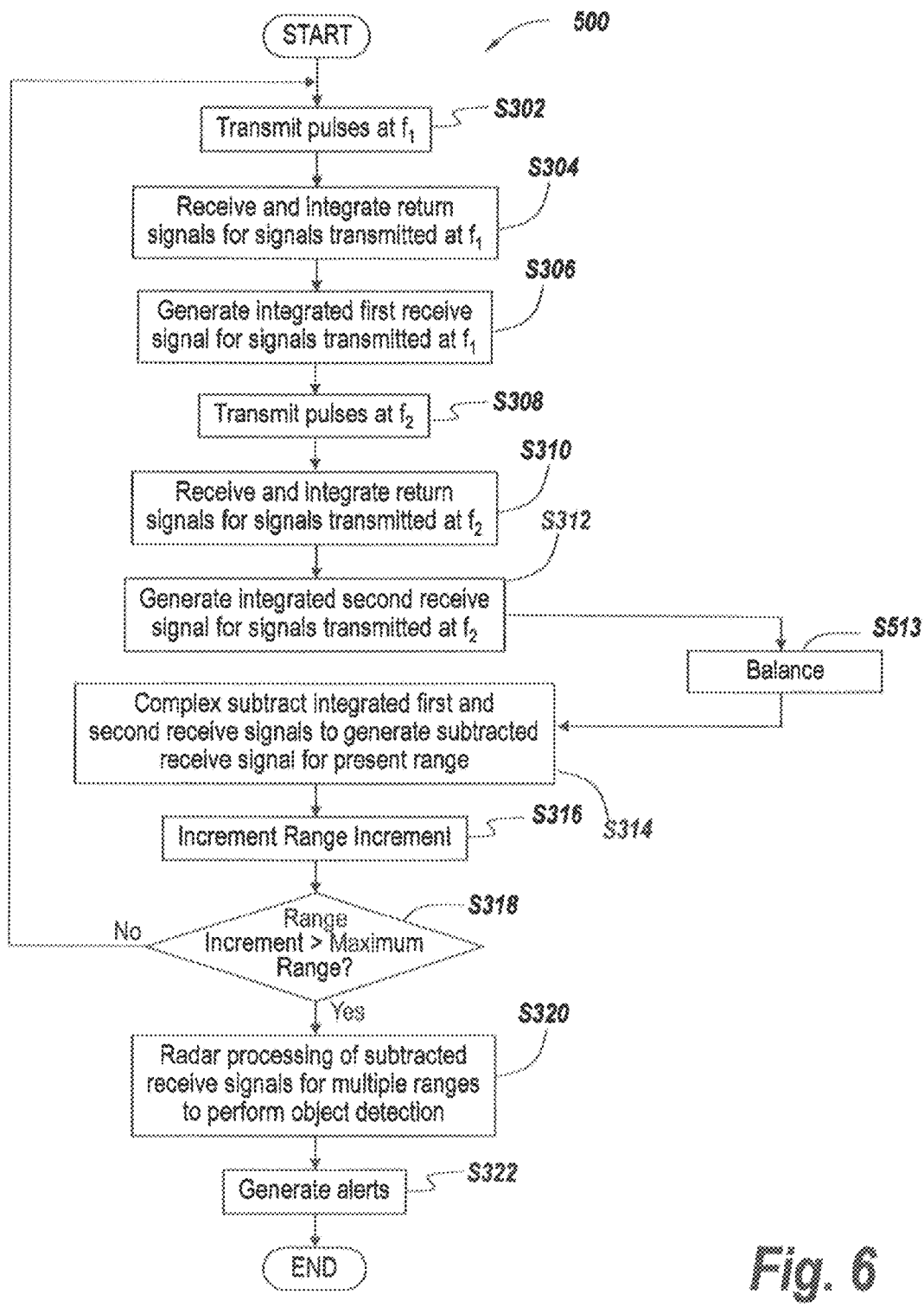
FIG. 6 includes a logical flow diagram illustrating the logical flow of the radar processing to attenuate near-range objects, using balanced FSK, according to some exemplary embodiments.

According to some exemplary embodiments, optimum cancellation of the unwanted bumper signal is achieved by dynamic balancing of the radar signals of the two different frequencies prior to differencing. This technique is referred to herein as "balanced FSK." FIG. 6 includes a logical flow diagram illustrating the logical flow of the radar processing to attenuate near-range objects, using balanced FSK, according to some exemplary embodiments. FIG. 6 includes a modification to the flow diagram of FIG. 4 to include the balancing step S513. All of the remaining steps of FIG. 6 have the same reference numerals of corresponding steps of FIG. 4 and are the same as described in detail above in connection with FIG. 4. Detailed description of these like steps will not be repeated.

Figure 7:
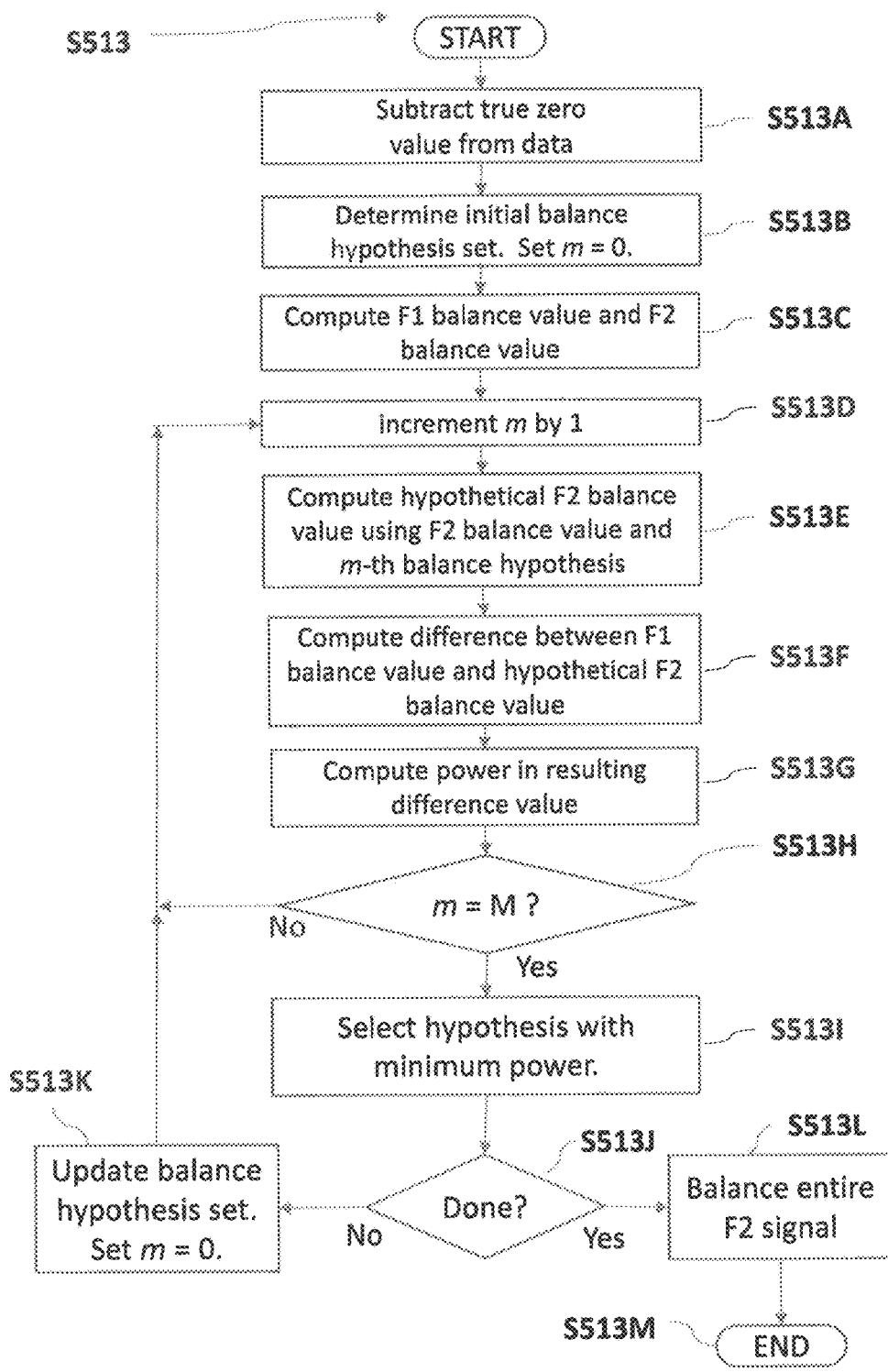
FIG. 7 includes a logical flow diagram illustrating the logical flow of the radar processing to produce the balancing that optimizes the dual-frequency difference, according to some exemplary embodiments.

FIG. 7 includes a logical flow diagram illustrating the logical flow of the radar processing to produce the balancing that optimizes the dual-frequency difference, according to some exemplary embodiments. That is, FIG. 7 includes a detailed logical flow diagram of the balancing step S513 shown in FIG. 6. The received signals F1 and F2 at the two different radar frequencies f1 and f2, respectively, are balanced to optimize the cancellation of the unwanted residual from FSK subtraction. The balance adjustment optimizes a measure of the match between the signals from the two radar frequencies. In some exemplary embodiments, the match is optimized for radar returns at the range of the bumper and other nearby objects. The balance adjustment results in a change to the complex phase and amplitude of one or both of the received signals. The amount of adjustment is determined by an optimization, e.g., minimization, process using radar signals from the region near the bumper.

In various embodiments, various types of optimization, for example, minimization, techniques may be employed. For example, a functional fit approach, or one or more of various methods of steepest descent may be utilized to perform the optimization, e.g., minimization. According to various exemplary embodiments, the balance adjustment is precomputed and stored as a constant value. According to other various embodiments, the balance adjustment is recomputed at various update rates.

Figure 9:
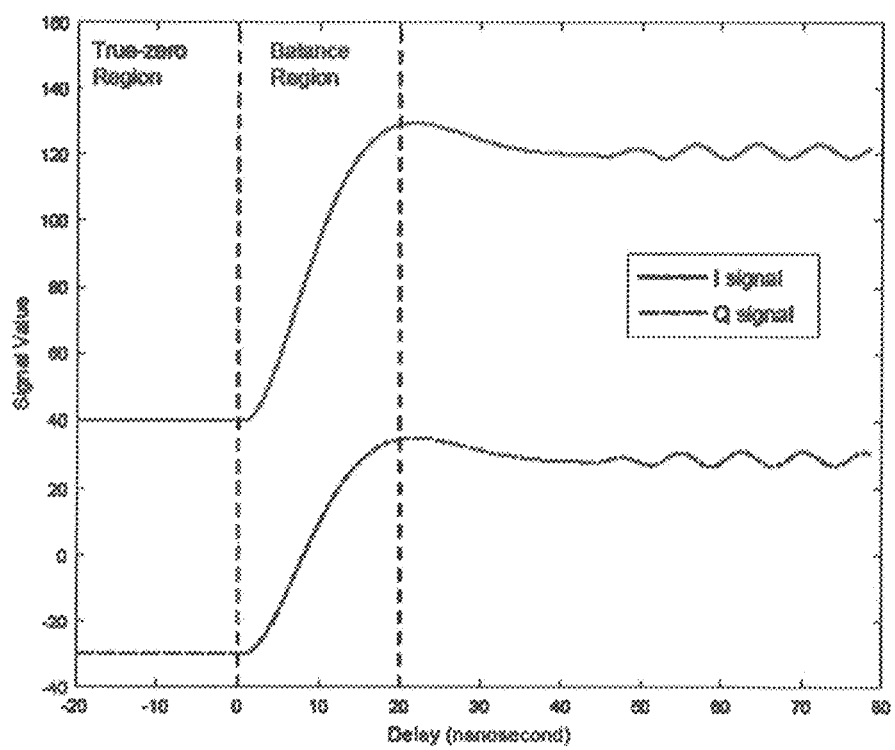
FIG. 9 includes a graph illustrating a pair of exemplary I and Q radar signals as a function of receive gate offset time, according to some exemplary embodiments.

FIG. 9 includes a graph illustrating a pair of exemplary I and Q radar signals as a function of receive gate delay time, according to some exemplary embodiments. Referring to FIG. 9, the signals are displayed according to receiver gate delay on the horizontal axis, which is related to object range through consideration of the time of round trip propagation of electromagnetic radiation between the radar and the object. The signals represent data from the radar frequency f1 only. The f2 radar data are similar but not displayed in FIG. 9. The left side of the curves represent early opening of the receive sample and hold and display the signal prior to any radar return. The value of the signal prior to any radar return depends on characteristics of the hardware. This region of signal, which is the portion of the signal to the left of the left-most dashed vertical line in FIG. 9, is defined to be the true zero region. The true zero value is computed as the average of the signal within the true zero region. The true zero value is computed independently for each of the radar signals, I and Q, for each of the two frequencies f1 and f2.

Referring to FIG. 7, according to the exemplary embodiments, the data are conditioned by subtracting the true zero value from the data, as illustrated at step S513A. Each true zero value is subtracted from the entire signal from which it was sampled. I and Q signals are conditioned separately. FIG. 9 illustrates an I and a Q signal prior to this conditioning, with the true zero at 40 and −30 respectively. The subtraction of the true zero value may be understood as the removal of unwanted offsets introduced by the specific characteristics of the radar hardware.

FIG. 9 shows the signals as a function of receiver gate delay, as determined by the timing of the receive sample and hold. Referring to FIG. 9, according to the exemplary embodiments, the balance region is denoted as the signal region between the two dashed vertical lines. The balance region corresponds to the receipt of radar reflected energy from objects at close ranges, including the bumper fascia. The signal function shown in FIG. 9 can be described as the integration of the receive gate pulse with the reflected radar signal from the longer transmit pulse. Various exemplary embodiments may assign the balance region to different locations on the signal. The important characteristic of the balance region is that it corresponds to the radar range where we desire to substantially attenuate or eliminate object detection.

Step S513B of FIG. 7 prepares the initial version of the balance hypothesis set. The balance hypothesis set is a set of M hypotheses, where the $m^{th}$ hypothesis includes a proposed balance amplitude $A_m$, and a proposed balance phase $\varphi_m$. In one exemplary embodiment, the initial version of the balance hypothesis set is defined as the set of M=9 hypotheses described by:

Initial balance hypothesis set=$\{A+i\,\Delta A,\;\varphi+j\,\angle\varphi\}$ where i∈{−1, 0, +1}
and j∈{−1, 0, +1}.

In one exemplary embodiment, the initial value of the amplitude A is 1.0, the initial value of phase $\varphi$ is 0.0 degrees, the value of the amplitude step $\Delta A$ is 0.1, and the value of phase step $\angle\varphi$ is 10 degrees. Other embodiments may determine the hypothesis set in a different manner.

Figure 8:
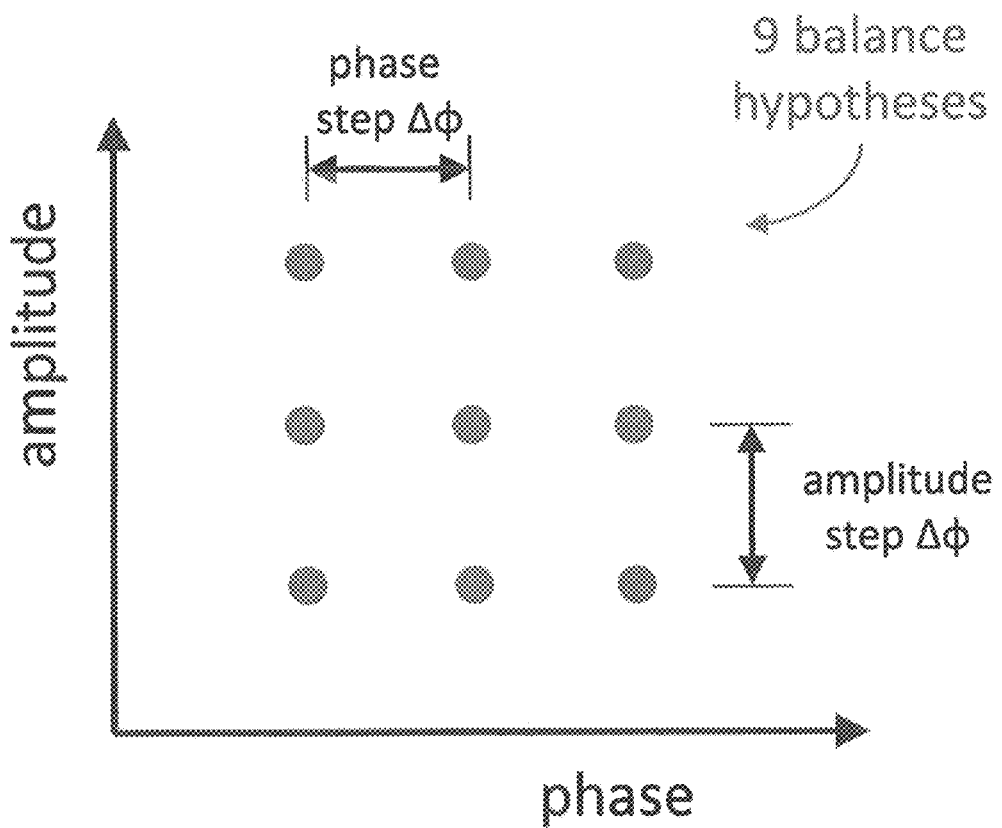
FIG. 8 includes a schematic diagram of the configuration of nine balance hypotheses in the two-dimensional space of amplitude and phase corrections, according to some exemplary embodiments.

FIG. 8 includes a schematic diagram of the configuration of nine balance hypotheses in the two-dimensional space of balance amplitude and balance phase, according to some exemplary embodiments. FIG. 8 uses small circles to illustrate the location of nine hypotheses in the two-dimensional space of balance amplitude and balance phase.

Step S513C of FIG. 7 computes the F1 balance value and the F2 balance value. According to one exemplary embodiment, the computation of each balance value is a simple average of a collection of samples from the balance region. Various embodiments may set the balance value from a single sample of the radar signal or a combination of several signal values from the balance region. Those of ordinary skill in the art will recognize that the balance values of the I and Q radar signals may be treated jointly as complex values. Two complex balance values are obtained for the two radar signals F1 and F2, collected with the radar frequencies f1 and f2, respectively.

Step S513D increments the hypothesis loop counter, which is denoted by m.

Step S513E computes the hypothetical F2 balance value using the F2 balance value determined in step S513C and the $m^{th}$ balance hypothesis.

$$F2'_I = A_m(F2_I \cos \varphi_m - F2_Q \sin \varphi_m)$$

$$F2'_Q = A_m(F2_Q \cos \varphi_m + F2_I \sin \varphi_m)$$

In the above equations, $F2'_I$ denotes the real part of the hypothetical F2 balance value, and $F2'_Q$ denotes the imaginary part of the hypothetical F2 balance value.

Step S513F computes the complex difference between the F1 balance value determined in step 513C and the hypothetical F2 balance value determined in step S513E.

Step S513G is the computation of a power in the difference value computed in step S513F. The power value is stored, indexed according to the hypothesis loop counter m. The power is defined as the sum of the squares of the in-phase and quadrature components of the complex difference value.

Step S513H terminates the loop over the balance hypotheses when all M balance hypothesis have been considered.

Step S513I selects the hypothesis with the minimum power from the set of M difference values computed during the previous M loops through step S513G. This balance hypothesis ($A_{min}$, $\varphi_{min}$) with the minimum power is saved as the best balance hypothesis.

Step S513J tests a stopping criterion to determine if a sufficient number of adjustments to the balance hypothesis set have been made. In one exemplary embodiment, the stopping criterion is met by performing 12 iterations of the loop that picks the best balance hypothesis. If the stopping criterion is not met, Step S513J sends the procedure back to step S513D, via step S513K, for the next iteration of the update of the balance hypothesis set.

Step S513K updates the balance hypothesis set in preparation for the next loop of processing. In one exemplary embodiment, the best hypothesis identified in Step S513I is used to update the balance hypothesis set. In one exemplary embodiment, Step S513K adjusts the value of the amplitude step $\angle A$ and the value of phase step $\angle\varphi$, in order to sample different points in the two-dimensional space of amplitudes and phases. In one exemplary embodiment, Step S513K determines the updated balance hypothesis set as follows:

Updated balance hypothesis set=$\{A+i\,\Delta A,\;\varphi+j\,\angle\varphi\}$ where i∈{−−1, 0, +1}
and j∈{−1, 0, +1}.

In one exemplary embodiment, the balance amplitude A used to update the balance hypothesis set is computed as the addition of the product of a fraction β and the balance amplitude from the best balance hypothesis $A_{min}$ and the product of a fraction (1−β) and the balance amplitude previously used to compute the balance hypothesis set. In an exemplary embodiment, the balance phase φ used to update the balance hypothesis set is computed as the addition of the product of a fraction β and the balance phase from the best balance hypothesis $\varphi_{min}$, and the product of a fraction (1−β) and the balance phase previously used to compute the balance hypothesis set. β is a value that controls the influence of the best balance hypothesis on the next balance hypothesis set. Using a value β<1.0 helps protect the algorithm from instability caused by measurement noise. In one exemplary embodiment, β has a constant value equal to 0.4.

In one exemplary embodiment, step 5313K also updates the amplitude step $\angle A$ and phase step $\angle\varphi$ that determines the next set of balance hypotheses. In one exemplary embodiment, each iteration uses an amplitude step $\angle A$ derived from the amplitude step of the previous iteration. If the previous iteration selected a best hypothesis with i=0, the new amplitude step $\angle A$ is reduced by the multiplicative factor 0.7 to refine the balance. If the previous iteration selected a best hypothesis using a changed balance amplitude A, that is, the value of index i was either +1 or −1, then the new amplitude step $\angle A$ is increased by the multiplicative factor 1.4. The phase step $\angle\varphi$ from one iteration to the next is adjusted with the same procedure as the amplitude step adjustment, with the amplitude hypothesis index i being replaced by the phase hypothesis index j. The objective of this procedure is to control the searching of balance values to assist convergence toward the optimum values.

Step S513L applies the final balance amplitude and balance phase, which is obtained from the most recently computed best balance hypothesis, to the entire signal F2 to create the balanced signal F2'.

Step S513M indicates the completion of the balancing procedure. The balanced signal F2' is used as the second received signal in step S314.

The iterated hypothesis balancing procedure of the exemplary embodiment illustrated in steps S513B to S513L implements an optimization, for example, minimization, of the FSK difference by searching the space of amplitude and phase of the signal F2. Other optimization techniques will be evident to those of ordinary skill in the art, and these techniques also provide a balanced FSK difference. Such techniques include, but are not limited to, the method of steepest descent, and the parametric modelling of the FSK difference as a function of balance amplitude and phase.

As shown in FIG. 6, step S314, the balance determined according to the exemplary embodiment is used to prepare the FSK difference data. That is, the balanced signal F2' is subtracted from the signal F1, using the same transform as in step S513F, thereby providing optimum cancellation of the unwanted radar signals from the bumper fascia. In some exemplary embodiments, the balance adjustment is recomputed every time the method of FIG. 6 is performed, to respond to changes related to environmental effects, such as precipitation, or changes in the geometry of the bumper, such as a mechanical deformation.

Figure 10:
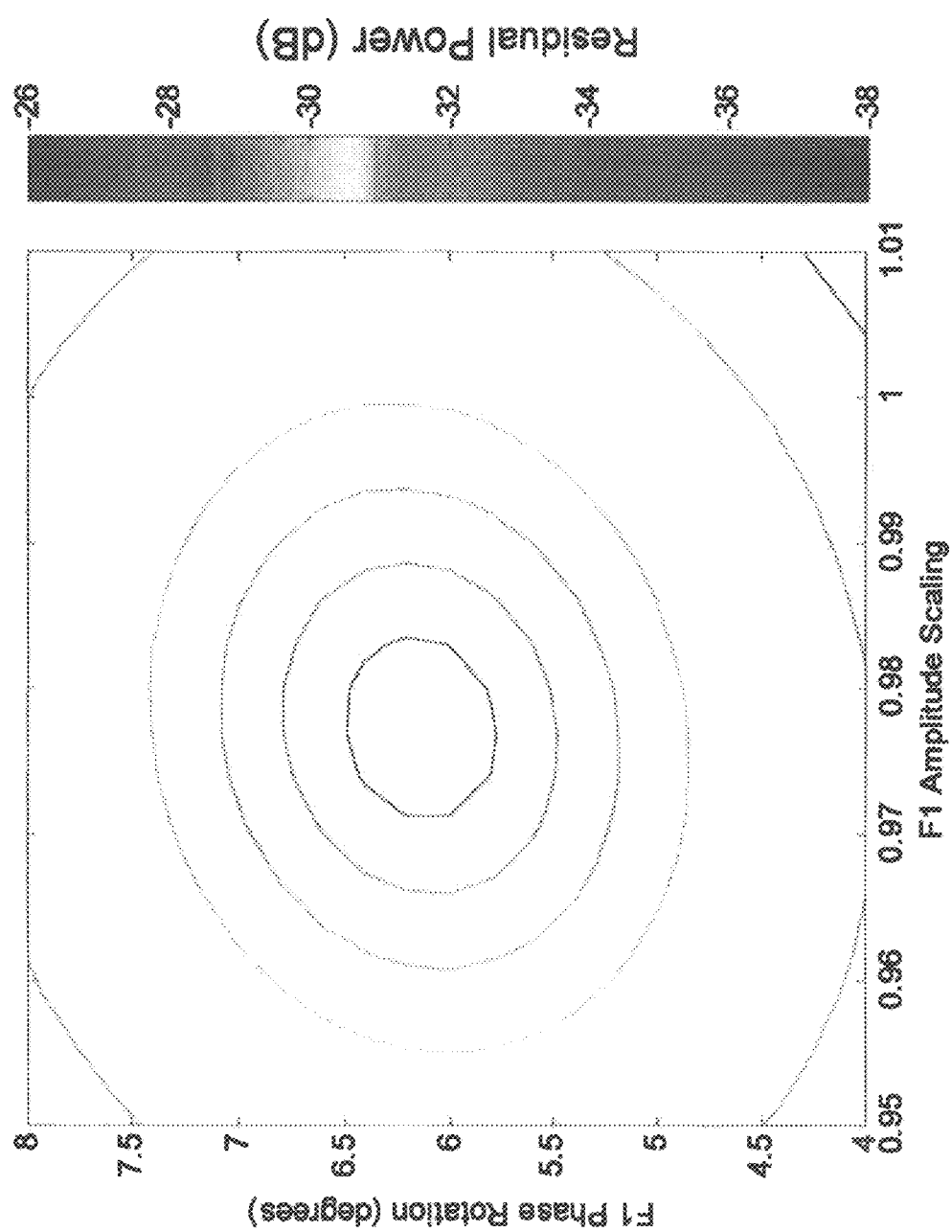
FIG. 10 includes a schematic diagram which illustrates the residual power of the FSK difference as a function of the balance value in the two-dimensional space of balance hypotheses (A, φ) for an exemplary ample data set, according to some exemplary embodiments.

FIG. 10 includes a schematic diagram which illustrates the residual power of the FSK difference as a function of the balance value in the two-dimensional space of balance hypotheses (A, $\varphi$) for an exemplary data set, according to some exemplary embodiments. The contours indicate a minimum power value near (0.98, 6.2°). The exemplary embodiment described herein iteratively approaches this minimum for the exemplary data set.

Figure 11A:
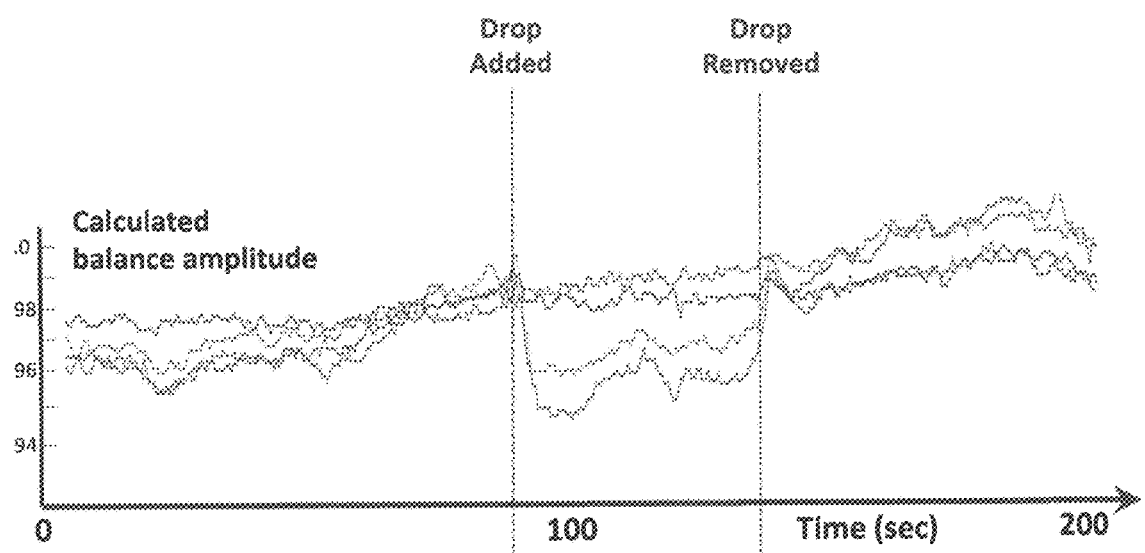
FIGS. 11A and 11B include timing diagrams which illustrate changes to the calculated balance amplitude and calculated balance phase for the balanced FSK signals taken with two different radar frequencies, as a function of time, illustrating the effect on those parameters of a drop of water located 2 cm from the sensor.
Figure 11B:
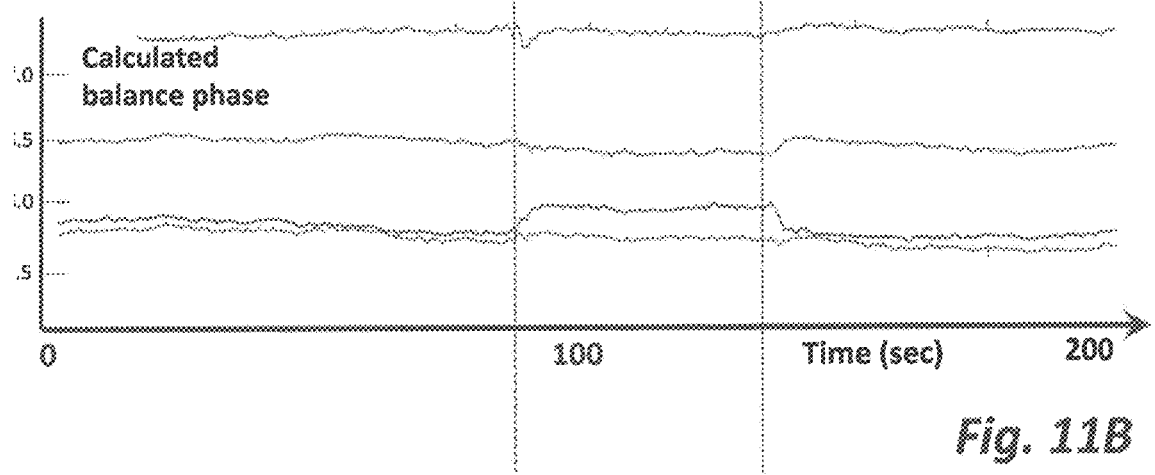

According to exemplary embodiments, the balanced FSK described herein is sensitive to changes in the environment. For example, tests have demonstrated that the FSK balancing described herein in detail is affected by a single drop of water. FIGS. 11A and 11B include timing diagrams which illustrate changes to the calculated balance amplitude and the calculated balance phase, determined using exemplary embodiments described by FIG. 7, as a function of time, illustrating the effect of a drop of water located 2 cm from the sensor.

FIG. 11A shows a plot of the calculated balance amplitude as a function of time. The figure has four balance amplitude functions, derived from four independent transmit/receive antenna pairs in an automotive sensor. It will be understood that present disclosure applies to any number of antenna pairs, and the selection of four antenna pairs is exemplary only. Balancing will affect each of the four transmit/receive antenna pairs independently. The balance amplitude values in the figure are all close to unity, in the range between 0.993 and 1.001, meaning that the F1 and F2 radar signals within a representative balance region, such as that illustrated by FIG. 9, have approximately the same amplitude. The figure shows balance amplitude values collected during a period of 200 seconds. The variation of the balance amplitude values over time indicate the usefulness of balancing frequently. In some exemplary embodiments, the balancing is done several times per second to compensate for these variations. FIGS. 11A and 11B indicate the time of the addition of a drop of water 2 cm from the radar sensor and the subsequent removal of that drop of water. FIG. 11A shows a clear change in some of the balance amplitude values correlated with the presence of the water drop. This effect on the balance amplitude demonstrates that the FSK balance algorithm will adjust to the changes in the physical environment near the sensor in order to achieve better cancellation between the F1 and F2 signals within the balance region.

Similarly, FIG. 11B shows a plot of the balance phase values as a function of time. As with FIG. 11A, curves for four independent transmit/receive antenna pairs are shown. As in FIG. 11A, a change due to the addition of a water drop is visible.

Figure 12:
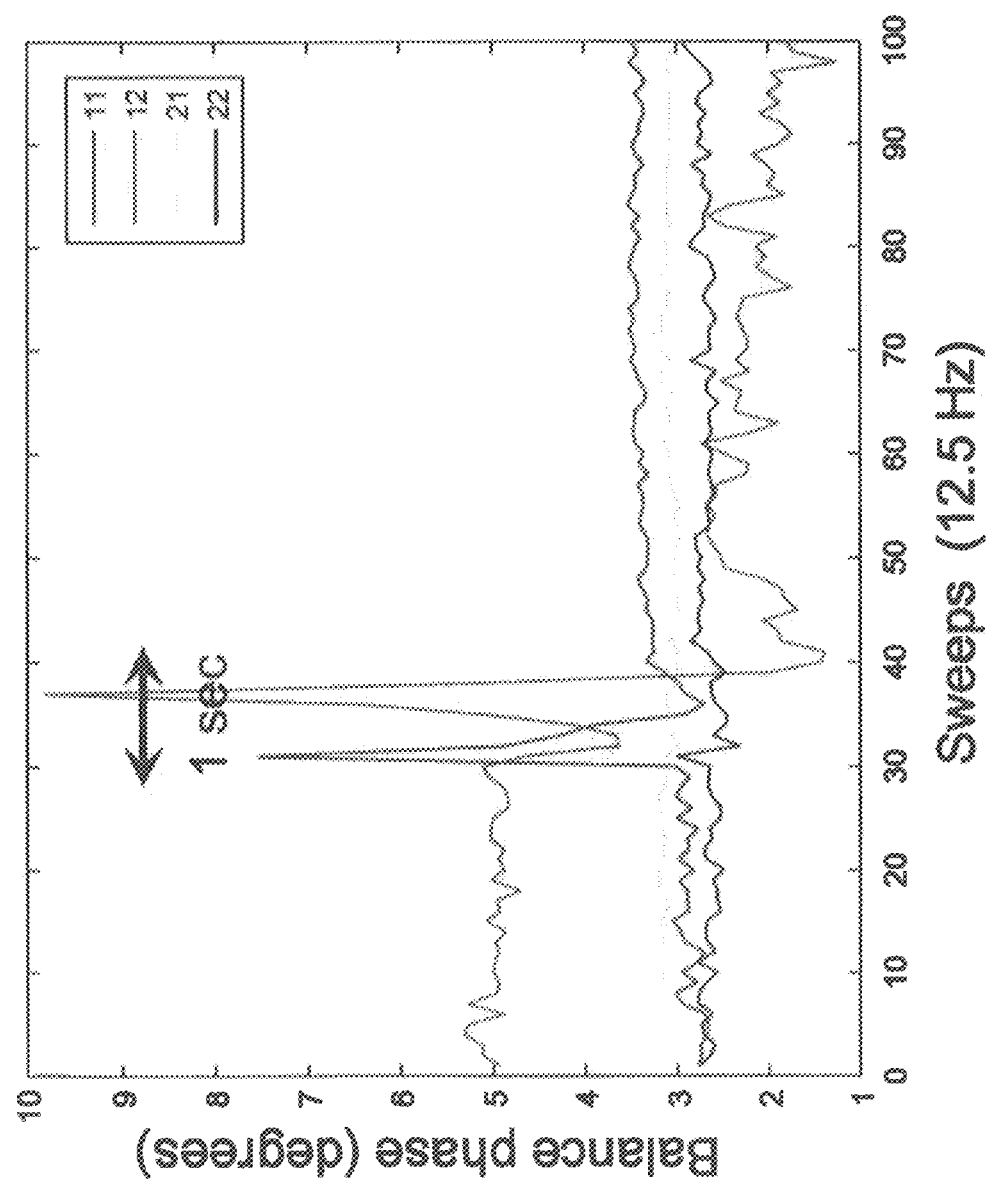
FIG. 12 includes a schematic diagram including graph plots which illustrate changes to the balance phase as a function of time, measured in radar sweeps, illustrating the effect on the balance phase of a splash of water on a nearby bumper fascia.

FIG. 12 includes a schematic diagram including graph plots which illustrate changes to the calculated balance phase as a function of time, measured in radar sweeps, illustrating the effect on the balance phase of a splash of water on a nearby bumper fascia, according to some exemplary embodiments. Specifically, FIG. 12 shows a plot of the balance phase $\varphi$ after balancing the F2 radar signal with the F1 radar signal. The figure shows the phase as a function of time, where the time is measured in radar sweeps that occur at a 12.5 Hz rate. The figure has four phase functions, derived from four independent transmit/receive antenna pairs in an automotive sensor. Four transmit receive antenna pairs are chosen for purposes of illustration only. The present disclosure is applicable to any number of antenna pairs. Balancing was applied to each of the transmit/receive antenna pairs independently. FIG. 12 shows a clear change in some of the balance phase functions that is attributed to the water splash. This demonstrates that the FSK balance phase will adjust to the changes in the physical environment near the sensor in order to achieve better cancellation between the F1 and F2 signals within the balance region.

According to exemplary embodiments, the balance adjustments described herein in detail can be applied to either or both of the two signals F1 and F2 for the two respective radar frequencies f1 and f2. Furthermore, according to exemplary embodiments, the technique described herein can be applied to multiple radar signals from one radar sensor apparatus, e.g., signals from different radar antennas in the same sensor. Also, according to alternative exemplary embodiments, the balance adjustment can be precomputed and stored as a constant, or it can be recomputed for every radar sweep, as described herein in detail, or it can be recomputed at any reduced rate. Also, determination of the optimum solution can be performed using the approach of the iterated multiple-hypothesis process, or using a minimum of a fitted function or by a method of steepest descent.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system, comprising:
a radar signal transmitter for transmitting transmitted radar signals into a region, a first transmitted radar signal having a first frequency and a second transmitted radar signal having a second frequency different from the first frequency;
a receiver for receiving reflected radar signals generated by reflection of the transmitted radar signals and generating receive signals indicative of the reflected radar signals, a first receive signal being indicative of a first reflected radar signal generated by reflection of the first transmitted radar signal, and a second receive signal being indicative of a second reflected radar signal generated by reflection of the second transmitted radar signal; and a processor configured to: (a) receive the first and second receive signals, (b) compute a difference between the first and second receive signals to generate a difference signal, (c) process the difference signal to provide radar information for the region, and adjust at least one of amplitude and phase of at least one of the first and second receive signals such that the difference is optimized at a preselected range from the receiver.

2. The radar system of claim 1, wherein the processor adjusts at least one of amplitude and phase of at least one of the first and second receive signals using a minimization process.

3. The radar system of claim 2, wherein the minimization process is an iterative minimization process.

4. The radar system of claim 2, wherein the minimization process comprises a functional fit approach.

5. The radar system of claim 2, wherein the minimization process comprises a steepest descent approach.

6. The radar system of claim 2, wherein the minimization process comprises a multiple-hypothesis approach.

7. The radar system of claim 1, wherein a difference between the first frequency and the second frequency is selected such that the information related to close-range objects in the region is attenuated in the difference signal.

8. The radar system of claim 1, wherein a difference between the first frequency and the second frequency is selected such that a phase difference between the first and second reflected radar signals is such that information related to close-range objects in the region is attenuated in the difference signal.

9. The radar system of claim 1, wherein the first frequency is approximately 24.2 GHz.

10. The radar system of claim 1, wherein a difference between the first frequency and the second frequency is approximately 11 MHz.

11. The radar system of claim 1, wherein the transmitted radar signals are pulse radar signals.

12. The radar system of claim 11, wherein a pulse of the pulse radar signals has a duration of approximately 120 nsec.

13. The radar system of claim 1, wherein the radar system is configured to be mounted in and operate in a vehicle.

14. The radar system of claim 13, wherein a difference between the first frequency and the second frequency is selected such that information related to close-range objects in the region is attenuated in the difference signal.

15. The radar system of claim 14, wherein the close-range objects in the region include a bumper fascia of an automobile in which the radar system is disposed.

16. The radar system of claim 13, wherein a difference between the first frequency and the second frequency is selected such that a phase difference between the first and second reflected radar signals is such that information related to close-range objects in the region is attenuated in the difference signal.

17. A radar processing method, comprising:
transmitting radar signals into a region, a first transmitted radar signal having a first frequency and a second transmitted radar signal having a second frequency different from the first frequency;

receiving reflected radar signals generated by reflection of the transmitted radar signals and generating receive signals indicative of the reflected radar signals, a first receive signal being indicative of a first reflected radar signal generated by reflection of the first transmitted radar signal, and a second receive signal being indicative of a second reflected radar signal generated by reflection of the second transmitted radar signal; and processing the first and second receive signals, said processing comprising: (a) receiving the first and second receive signals, (b) computing a difference between the first and second receive signals to generate a difference signal, (c) processing the difference signal to provide radar information for the region, and adjusting at least one of amplitude and phase of at least one of the first and second receive signals such that the difference is optimized at a preselected range from the receiver.

18. The method of claim 17, wherein adjusting at least one of amplitude and phase of at least one of the first and second receive signals uses a minimization process.

19. The method of claim 18, wherein the minimization process is an iterative minimization process.

20. The method of claim 18, wherein the minimization process comprises a functional fit approach.

21. The method of claim 18, wherein the minimization process comprises a steepest descent approach.

22. The method of claim 18, wherein the minimization process comprises a multiple-hypothesis approach.

23. The method of claim 17, wherein a difference between the first frequency and the second frequency is selected such that the information related to close-range objects in the region is attenuated in the difference signal.

24. The method of claim 17, wherein a difference between the first frequency and the second frequency is selected such that a phase difference between the first and second reflected radar signals is such that information related to close-range objects in the region is attenuated in the difference signal.

25. The method of claim 17, wherein the first frequency is approximately 24.2 GHz.

26. The method of claim 17, wherein a difference between the first frequency and the second frequency is approximately 11 MHz.

27. The method of claim 17, wherein the transmitted radar signals are pulse radar signals.

28. The method of claim 27, wherein a pulse of the pulse radar signals has a duration of approximately 120 nsec.

29. The method of claim 17, wherein the method is carried out in a radar system configured to be mounted in and operate in a vehicle.

30. The method of claim 29, wherein a difference between the first frequency and the second frequency is selected such that information related to close-range objects in the region is attenuated in the difference signal.

31. The method of claim 30, wherein the close-range objects in the region include a bumper fascia of the vehicle.

32. The method of claim 29, wherein a difference between the first frequency and the second frequency is selected such that a phase difference between the first and second reflected radar signals is such that information related to close-range objects in the region is attenuated in the difference signal.

* * * * *